United States Patent [19]

Cramer et al.

[11] Patent Number: 5,385,774

[45] Date of Patent: Jan. 31, 1995

[54] ROOF MATERIAL FOR MOTOR VEHICLES

[75] Inventors: Johannes Cramer, Ahaus; Erwin Winterberg; Hans Nockemann, both of Wuppertal, all of Germany

[73] Assignee: Gebr. Happich GmbH, Germany

[21] Appl. No.: 464,133

[22] Filed: Jan. 16, 1990

[30] Foreign Application Priority Data

Jan. 13, 1989 [DE] Germany .............................. 3900846

[51] Int. Cl.6 ........................ B32B 25/00; B60J 7/00; B60J 11/00
[52] U.S. Cl. .................................... 428/247; 428/246; 428/250; 428/252; 428/257; 428/260; 428/284; 428/909; 296/98; 296/210; 296/900
[58] Field of Search ............... 428/246, 250, 902, 284, 428/244, 247, 252, 257, 260, 284, 909; 296/107, 222, 210, 98, 900

[56] References Cited

U.S. PATENT DOCUMENTS

| | | | |
|---|---|---|---|
| 4,526,828 | 7/1985 | Fogt et al. | 428/229 |
| 4,770,927 | 9/1988 | Effenberger et al. | 428/245 |

Primary Examiner—Patrick J. Ryan
Assistant Examiner—Richard C. Weisberger
Attorney, Agent, or Firm—Ostrolenk, Faber, Gerb & Soffen

[57] ABSTRACT

A roof material for motor vehicles includes an upper fabric, a lower fabric and a rubber layer arranged between them. The upper fabric includes polyacrylonitrile warp and filling threads. The warp threads are endless filaments (multifilaments). The upper fabric has a protective, polymeric coating on its top side. The rubber layer includes two rubber layers with an intermediate layer of high-strength material.

17 Claims, 1 Drawing Sheet

ROOF MATERIAL FOR MOTOR VEHICLES

BACKGROUND OF THE INVENTION

Field of the Invention

The invention relates to roof material for motor vehicles, more particularly, for convertible motor vehicles.

Roof materials for motor vehicles have been known for decades. The known roof materials, however, have been generally unsatisfactory in several respects. For example, it has been found that corrosive environmental conditions damage conventional roof materials, reducing their resistance to weathering and dirt. Thus, the known roof materials generally do not achieve levels of durability desired by consumers.

SUMMARY OF THE INVENTION

Accordingly, it is an object of the invention to provide a novel roof material for motor vehicles, particularly convertible motor vehicles, which overcomes the deficiencies associated with the known roof materials.

This objective, and other objectives, are achieved by providing a roof material which comprises an upper fabric, a lower fabric, and a rubber layer located between the upper and lower fabrics. The upper fabric comprises polyacrylonitrile warp and filling threads, the warp threads (and optionally the filling threads) being endless. A transparent, protective coating is provided on the upper fabric. This coating preferably includes a fluorine-containing polymer such as tetrafluoroethylene polymer. The rubber layer comprises two or more rubber layers and an intermediate layer of high strength material. The intermediate layer comprises a layer of either fiber or filament, preferably carbon, steel, highly stretched polyethylene or polyamide fiber or filament. The fiber or filament of the intermediate layer may be oriented at an angle between 30° and 60° to the longitudinal axis of the intermediate layer, most preferably 45°. The lower fabric is a woven or knitted fabric of mostly synthetic fiber or filament.

In a further embodiment of the invention, electrically conductive material, such as electrically conductive fiber, filament, wire or foil strip, may be provided in the upper fabric, lower fabric or rubber layer for connection to an anti-theft means for the motor vehicle.

As used herein, the term "warp thread" includes the lengthwise threads of a fabric around which filling thread is interlaced.

As used herein, the term "filling thread" includes the threads interlacing the warp threads in a fabric at substantially right angles.

As used herein, the term "endless thread" includes multifilaments or threads composed of many individual filaments as opposed to monofilament.

BRIEF DESCRIPTION OF THE DRAWINGS

Other features and advantages of the present invention will become apparent when the following description is read in conjunction with the accompanying drawings, in which.

DETAILED DESCRIPTION OF THE PREFERRED EMBODIMENTS

Figure 1:
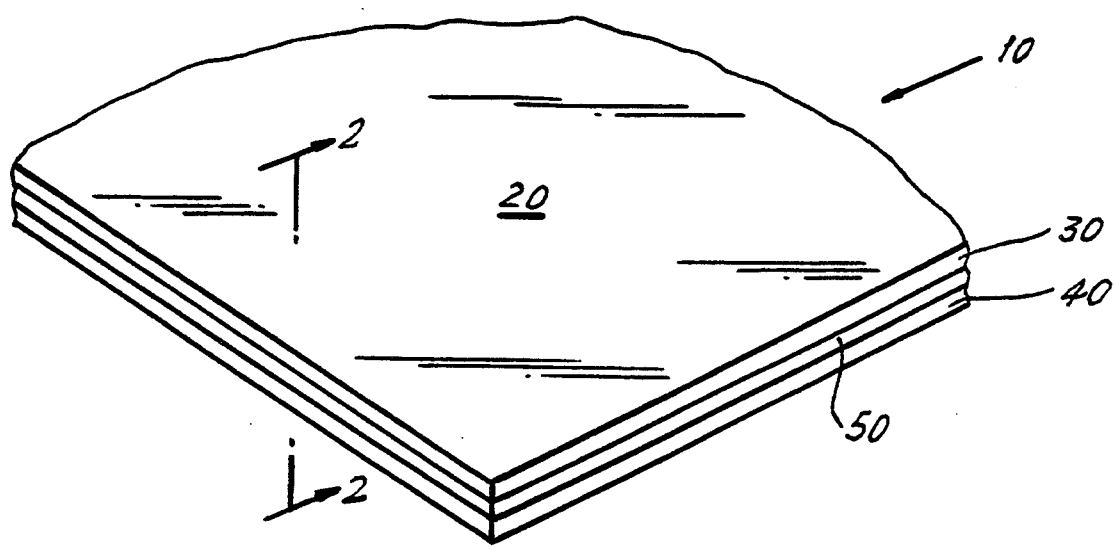
FIG. 1 shows a plan view of a portion of the roof material of the invention.
Figure 2:
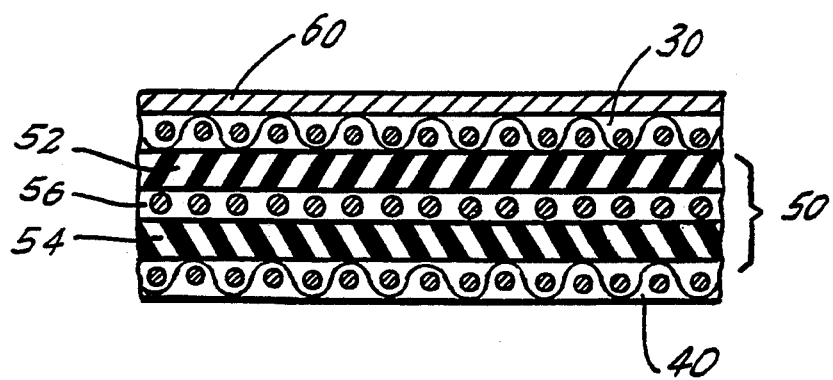
FIG. 2 shows a cross-sectional view of the roof material along lines 2—2 shown in FIG. 1.

Referring now to FIGS. 1 and 2, the roofing material 10 according to the invention generally comprises a laminate 20 including an upper fabric 30, a lower fabric 40 and a rubber layer 50 located therebetween.

The upper or facing fabric 30 is a woven layer of polyacrylonitrile warp and filling threads. The warp threads, and optionally the filling threads, are endless threads. This layer is provided with a protective coating 60 on at least its top side. The coating preferably is transparent. A coating agent including a fluorine-containing polymer, such as a tetrafluoroethylene polymer dispersion, is preferably employed to form the coating. Moreover, the upper fabric may be impregnated by dip-coating with a tetrafluoroethylene polymer dispersion such as HOSTAFLON, which is available from Hoechst AG.

The lower or base fabric 40 of the roof material of the invention is a woven or knitted fabric of mostly or completely synthetic fibers or threads, for example, synthetic yarn made of polyamide, polyester, mixed polyamide-and-polyester filaments, nylon, polypropylene, or similar chemical fibers. This layer provides relatively high abrasion resistance which is particularly advantageous where the roof material of the present invention is employed as an automatically extendable and retractable convertible roof, since in this instance the roof material is subjected to increased stress due to wear. Such a layer also allows for adapting the color of the roof material to the interior furnishings of the specific vehicle.

The rubber layer located between the upper and lower fabric layers includes two or more rubber layers 52 and 54 and an intermediate layer of a high strength material 56 located therebetween. The intermediate layer 56 is a layer of fibers or filaments, preferably polyamide filament, although the fibers or filaments may consist of any suitable material such as carbon, steel or highly stretched polyethylene. An especially preferred polyamide filament is the high strength polyamide filament material known as ARAMID available from DuPont.

Preferably, the intermediate layer consists of a lattice fabric of polyamide warp and filling threads oriented at an angle between about 30° and 60°, most preferably 45°, to the longitudinal axis of this fabric. Thus, the roof material is equally stretchable, i.e., isotropic in its longitudinal, transverse and diagonal directions. Accordingly, the relative ease of cutting the roof is reduced, and fatigue of the roof material is reduced.

The roof material of the invention may have embedded therein electrically conductive material such as fibers, filaments, wires or foil strips, so that the roof material is capable of acting as a "Faraday cage", shielding the passengers from lightning in the event of a storm. While not wishing to be bound by theory, it is believed that embedding wires or similar structures into the roofing material surrounds the passengers on all sides with electrically conductive material like a cage and accordingly protects them from lightning better than with a roof material without wires or similar structure.

Additionally, such electrically conductive material may be embedded within the upper fabric, lower fabric or rubber layer, in a manner such that the roof material may be connected to an alarm system for protection against theft of the motor vehicle.

By virtue of the invention, substantial advantages in various respects are achieved over the known roofing materials. The roof material of the invention is highly resistant to light and the "elements" in general, and also has good elasticity and retention of heat. The endless warp threads improve the strength of the roof and reduce its stretching. The transparent plastic coating improves the roof's resistance to the elements, reduces adherence of dirt, and protects the roof when it is being cared for, in particular, when it is being washed by an automatic car wash.

Other advantages include increased UV protection, which in turn results in longer roof life. Other advantages are good sliding properties, anti-adhesivity, water repellency and high resistance to chemicals. The intermediate layer provides high strength and low stretchability, and increases the roof's resistance to being slit, for instance, with a knife. Furthermore, the so-called "ballooning" effect of convertible roofs which is caused by the difference in air pressure between the outside and inside of the vehicle at high speeds, is reduced in convertible roofs constructed of the roof material of the invention.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A roof material for a motor vehicle, comprising an upper fabric, a lower fabric and a rubber layer disposed therebetween, said upper fabric being comprised of polyacrylonitrile warp threads and polyacrylonitrile filling threads wherein at least the polyacrylonitrile warp threads are endless threads, said rubber layer being comprised of at least two rubber sublayers and an intermediate layer disposed between said sublayers.

2. The roof material of claim 1, wherein said polyacrylonitrile filling threads are endless threads.

3. The roof material of claim 1, further comprising a transparent, plastic coating disposed on at least a top side of said upper fabric, said coating being a protective coating for said roof material.

4. The roof material of claim 3, wherein said coating includes a fluorine-containing polymer.

5. The roof material of claim 4, wherein said fluorine-containing polymer is a tetrafluoroethylene polymer.

6. The roof material of claim 1, wherein said intermediate layer comprises a layer of fibers or filaments.

7. The roof material of claim 6, wherein said fibers or filaments are fibers or filaments of a material selected from the group consisting of carbon, steel, polyethylene and polyamide.

8. The roof material of claim 6, wherein said fiber or filaments are arranged as a lattice fabric.

9. The roof material of claim 8, wherein said fibers or filaments of said lattice fabric layer are oriented at an angle between about 30° and about 60° to the longitudinal axis of said lattice fabric.

10. The roof material of claim 9, wherein said fibers or filaments of said lattice fabric are oriented at an angle of about 45° to the longitudinal axis of said lattice fabric.

11. The roof material of claim 1, wherein said lower fabric comprises a woven or knitted fabric.

12. The roof material of claim 11, wherein said woven or knitted fabric comprises a fabric of synthetic fiber or filament.

13. The roof material of claim 1, further comprising an electrically conductive material disposed in said roofing material for connection to an anti-theft means for said motor vehicle.

14. The roof material of claim 13, wherein said electrically conductive material is an electrically conductive material selected from the group consisting of fiber, filament, wire and foil strip.

15. The roof material of claim 14, wherein said electrically conductive material is disposed in said upper fabric.

16. The roof material of claim 14, wherein said electrically conductive material is disposed in said intermediate layer.

17. The roof material of claim 14, wherein said electrically conductive material is disposed in said lower fabric.

* * * * *